United States Patent
Jiang et al.

(10) Patent No.: US 12,534,381 B2
(45) Date of Patent: Jan. 27, 2026

(54) METHOD FOR MAKING BARIUM TITANATE NANOPOWDERS

(71) Applicants: Wuhan Institute of Technology, Wuhan (CN); Wuhan Great Materials Co., Ltd., Wuhan (CN)

(72) Inventors: Xingmao Jiang, Wuhan (CN); Qilong Wu, Wuhan (CN); Long Chen, Wuhan (CN); Lang Yang, Wuhan (CN); Biyi Chen, Wuhan (CN); Shengjun Yi, Wuhan (CN); Yunfeng Liao, Wuhan (CN)

(73) Assignees: Wuhan Institute of Technology, Wuhan (CN); Wuhan Great Materials Co., Ltd., Wuhan (CN)

( * ) Notice: Subject to any disclaimer, the term of this patent is extended or adjusted under 35 U.S.C. 154(b) by 538 days.

(21) Appl. No.: 18/077,480

(22) Filed: Dec. 8, 2022

(65) Prior Publication Data
US 2023/0183088 A1    Jun. 15, 2023

(30) Foreign Application Priority Data
Dec. 10, 2021    (CN) .................... 202111507128.3

(51) Int. Cl.
C01G 23/00    (2006.01)

(52) U.S. Cl.
CPC ........ *C01G 23/006* (2013.01); *C01P 2002/72* (2013.01); *C01P 2004/03* (2013.01); *C01P 2004/64* (2013.01)

(58) Field of Classification Search
CPC ..................................................... C01G 23/006
See application file for complete search history.

(56) References Cited

FOREIGN PATENT DOCUMENTS

CN         107697947 A  *  2/2018  ............. B82Y 40/00

* cited by examiner

*Primary Examiner* — James A Fiorito
(74) *Attorney, Agent, or Firm* — ANOVA LAW GROUP, PLLC

(57) ABSTRACT

A method for making barium titanate nanopowders, includes mixing barium salt, titanium source, carbohydrate, and urea in a container according to a first ratio, stirring the barium salt, the titanium source, the carbohydrate, and the urea in the container under a heating condition approximately from 60° C. to 120° C. to obtain a molten mixture, heating the molten mixture to dehydrate and carbonize the carbohydrate to obtain a dark brown solid, and performing a heat treatment on the dark brown solid to obtain the barium titanate nanopowders.

10 Claims, 5 Drawing Sheets

---

Mix barium salt, titanium source, carbohydrate, and urea in a container according to a first ratio, stir the barium salt, the titanium source, the carbohydrate, and the urea in the container under a heating condition from approximately 60°C to 120°C to obtain a molten mixture S101

Heat the molten mixture to dehydrate and carbonize the carbohydrate to obtain a dark brown solid S102

Perform a heat treatment on the dark brown solid to obtain the barium titanate nanopowders S103

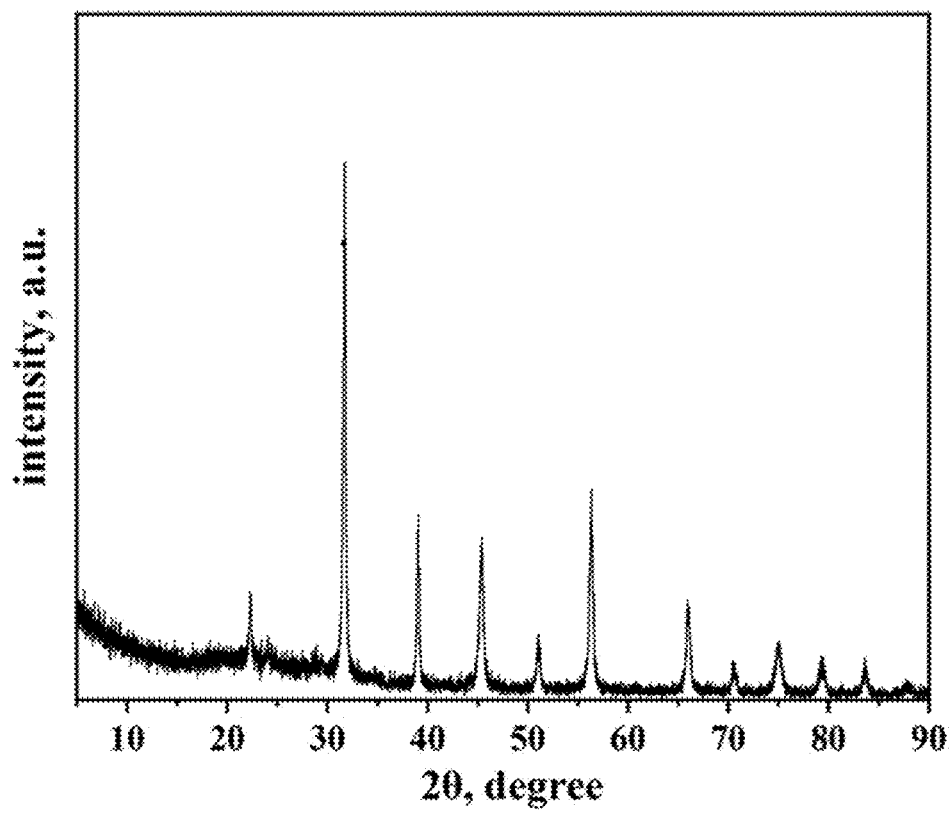

```
┌─────────────────────────────────────────────────────────────────────┐
│ Mix barium salt, titanium source, carbohydrate, and urea in a container │
│ according to a first ratio, stir the barium salt, the titanium source, the │
│ carbohydrate, and the urea in the container under a heating condition from │
│ approximately 60°C to 120°C to obtain a molten mixture S101         │
└─────────────────────────────────────────────────────────────────────┘
                                  │
                                  ▼
┌─────────────────────────────────────────────────────────────────────┐
│ Heat the molten mixture to dehydrate and carbonize the carbohydrate to │
│                 obtain a dark brown solid S102                       │
└─────────────────────────────────────────────────────────────────────┘
                                  │
                                  ▼
┌─────────────────────────────────────────────────────────────────────┐
│ Perform a heat treatment on the dark brown solid to obtain the barium │
│                   titanate nanopowders S103                          │
└─────────────────────────────────────────────────────────────────────┘
```

METHOD FOR MAKING BARIUM TITANATE NANOPOWDERS

CROSS-REFERENCE TO RELATED APPLICATION

The present application claims priority to Chinese Patent Application No. 202111507128.3, filed Dec. 10, 2021, the entire content of which is incorporated herein by reference.

TECHNICAL FIELD

The present disclosure relates to the field of making nano material and, in particular, to a method for making barium titanate nanopowders.

BACKGROUND

Barium titanate ($BaTiO_3$) has good dielectric, ferroelectric, and piezoelectric properties, making it a very attractive material in the fields of ferroelectric ceramics and microelectronics. The high dielectric constant and low dielectric loss properties of barium titanate make it ideal for applications, for example, electronic ceramics, positive temperature coefficient (PTC) thermistors, and chip multilayer ceramic capacitors (MILCCs).

Selection of synthesis method of barium titanate powders depends on cost and application of the barium titanate powder. Quality of the barium titanate powders is not only affected by the synthesis method, but also by the raw materials. The increasing miniaturization of electronic devices has increased the demand for powders with smaller dimensions and controllable morphologies. The successful synthesis of barium titanate powders with unique dielectric properties largely depends on the purity and crystal structure. A traditional solid-phase method has problems of high reaction temperature, uneven solid-phase reaction, and high agglomeration, large particle size (2-5 µm), and high impurity content of the made barium titanate powders. A co-precipitation method needs to control many conditions. Moreover, it is difficult to achieve optimal conditions for simultaneous precipitation of $Ba^{2+}$ and $Ti^{4+}$ according to the stoichiometric ratio. The barium titanate powders made by a sol-gel method has small particle size (20-100 nm) and few impurities, but has low crystallinity and inhomogeneous morphology. A hydrothermal method does not require complicated equipment and expensive reagents. However, the particle size distribution of the synthesized barium titanate powders by the hydrothermal method is relatively wide.

The barium titanate powders currently made by traditional methods has serious agglomeration, large particle size, high impurity content, low crystallinity, relatively wide particle size distribution, high reaction temperature, non-uniform reaction, and relatively hard-controlled morphology, which directly affect the performance and application of the barium titanate powders.

SUMMARY

In accordance with the disclosure, there is provided a method for making barium titanate nanopowders, including mixing barium salt, titanium source, carbohydrate, and urea in a container according to a first ratio, stirring the barium salt, the titanium source, the carbohydrate, and the urea in the container under a heating condition from approximately 60° C. to 120° C. to obtain a molten mixture, heating the molten mixture to dehydrate and carbonize the carbohydrate to obtain a dark brown solid, and performing a heat treatment on the dark brown solid to obtain the barium titanate nanopowders.

BRIEF DESCRIPTION OF THE DRAWINGS

FIG. 1 is a schematic flow chart of a method for making barium titanate nanopowders consistent with the embodiments of the disclosure.

FIG. 2 is an X-ray crystallography (XRD) spectrum of cubic phase barium titanate nanopowders made according to an example embodiment of the disclosure.

DETAILED DESCRIPTION OF THE EMBODIMENTS

Figure 3:
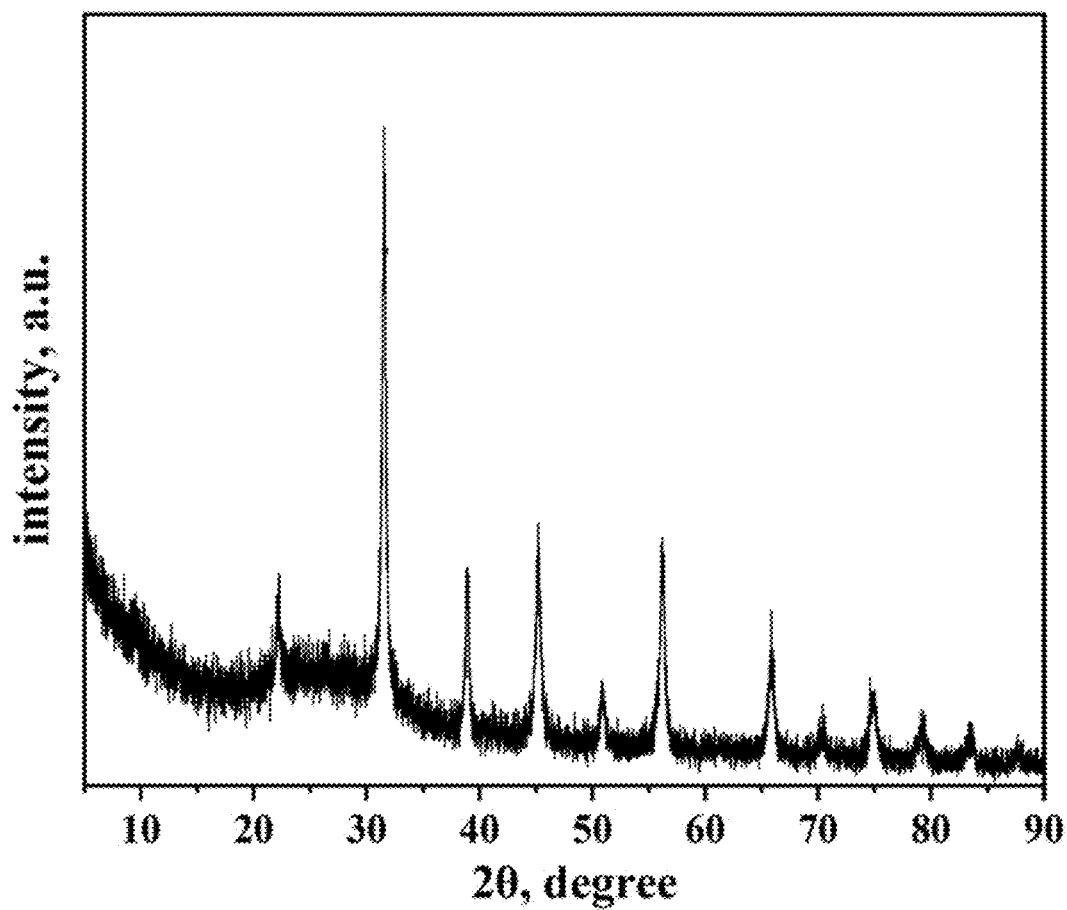
FIG. 3 is an XRD spectrum of cubic phase barium titanate nanopowders made according to another example embodiment of the disclosure.

Technical solutions of the present disclosure will be described with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

FIG. 1 is a schematic flow chart of a method for making barium titanate nanopowders consistent with the embodiments of the disclosure. As shown in FIG. 1, the method for making the barium titanate nanopowders includes following processes.

At S101, barium salt, titanium source, carbohydrate, and urea are mixed in a container according to a first ratio, and the barium salt, the titanium source, the carbohydrate, and the urea in the container are stirred under a heating condition approximately from 60° C. to 120° C. to obtain a molten mixture.

In some embodiments, the first ratio includes a molar ratio between the barium salt and the titanium source as 1:(1-1.5).

In some embodiments, the first ratio includes a ratio among a total mass of the barium salt and the titanium source, a mass of the carbohydrate, and a mass of the urea as 1:(1-10):(1-10).

In some embodiments, the barium salt includes at least one of nitrate, halogenated salt, hypochlorite, acetates, or oxalate.

In some embodiments, the titanium source includes titanium tetrachloride, titanium tetrabromide, tetraethyl titanate, tetrabutyl titanate, or titanium isopropoxide.

In some embodiments, the carbohydrate includes at least one of glucose, fructose, sucrose, maltose, lactose, starch, or dextrin.

At S102, the molten mixture is heated to dehydrate and carbonize the carbohydrate to obtain a dark brown solid.

In some embodiments, the molten mixture is heated to dehydrate and carbonize the carbohydrate to obtain the dark brown solid in a normal pressure or in an airtight reaction kettle.

In some embodiments, heating the molten mixture to dehydrate and carbonize the carbohydrate to obtain the dark brown solid includes microwaving the molten mixture 0.1 minute to 60 minutes with a microwave power of 0.1 kW to 50 kW.

In some embodiments, heating the molten mixture to dehydrate and carbonize the carbohydrate to obtain the dark brown solid includes heating the molten mixture at a temperature approximately from 120° C. to 250° C. for 1 hour to 48 hours. In some embodiments, the molten mixture may be heated at the temperature approximately from 120° C. to 250° C. for 8 hours to 48 hours.

In some embodiments, the molten mixture is heated to dehydrate and carbonize the carbohydrate to provide a carbon templet to cause the barium salt and the titanium source to be evenly distributed on the carbon templet.

At S103, a heat treatment is performed on the dark brown solid to obtain the barium titanate nanopowders.

In some embodiments, performing the heat treatment on the dark brown solid to obtain the barium titanate nanopowders includes calcining the dark brown solid at 400° C. to 600° C. for 1 hour to 10 hours in an air atmosphere to remove carbon to obtain the barium titanate nanopowders. In some embodiments, the dark brown solid may be calcined at 400° C. to 600° C. for 8 hours to 10 hours in the air atmosphere to remove carbon to obtain the barium titanate nanopowders In some embodiments, performing the heat treatment on the dark brown solid to obtain the barium titanate nanopowders includes performing the heat treatment on the dark brown solid at 700° C. to 1000° C. for 1 hour to 10 hours in a protective gas atmosphere to obtain a carbon composite carrier-supported nano-barium titanate material, and performing the heat treatment on the carbon composite carrier-supported nano-barium titanate material at 400° C. to 600° C. for 1 hour to 10 hours in an air atmosphere to remove carbon to obtain the barium titanate nanopowders. In some embodiments, the heat treatment may be performed on the dark brown solid at 700° C. to 1000° C. for 4 hours to 8 hours in the protective gas atmosphere to obtain a carbon composite carrier-supported nano-barium titanate material. The heat treatment may be performed on the carbon composite carrier-supported nano-barium titanate material at 400° C. to 600° C. for 4 hours to 10 hours in the air atmosphere to remove carbon to obtain the barium titanate nanopowders.

In some embodiments, performing the heat treatment on the dark brown solid to obtain the barium titanate nanopowders includes performing the heat treatment on the dark brown solid to remove the carbon templet.

Unless otherwise specified, experimental drugs in the following embodiments were obtained from the market and used directly.

In an example embodiment, 1.3067 g (0.005 mol) barium nitrate, 1.7016 g (0.005 mol) tetrabutyl titanate, 4.00 g anhydrous glucose, and 3.01 g urea were mixed in a container and heated to 100° C. The barium nitrate, the tetrabutyl titanate, the anhydrous glucose, and the urea in the container were stirred and mixed evenly at 100° C. to obtain a molten mixture. A molar ratio between the barium nitrate and the tetrabutyl titanate was 1:1. A ratio among a total mass of the barium nitrate and the tetrabutyl titanate, a mass of the anhydrous glucose, and a mass of the urea was 1:1.33:1. The molten mixture was then put into a 120° C. oven and heated for 48 hours to cause the anhydrous glucose to be dehydrated and carbonized to obtain a dark brown solid. The dark brown solid was calcined at 400° C. for 10 hours in an air atmosphere to remove carbon to obtain the barium titanate nanopowders.

FIG. 2 is an X-ray crystallography (XRD) spectrum of cubic phase barium titanate nanopowders made according to the above example embodiment. As shown in FIG. 2, the obtained barium titanate nanopowders are in a cubic phase with few impurity peaks and a single crystal form.

In another example embodiment, 1.2771 g (0.005 mol) barium acetate, 2.0419 g (0.006 mol) tetrabutyl titanate, 33.19 g fructose, and 16.60 g urea were mixed in a container and heated to 90° C. The barium acetate, the tetrabutyl titanate, the fructose, and the urea in the container were stirred and mixed evenly at 90° C. to obtain a molten mixture. A molar ratio between the barium acetate and the tetrabutyl titanate was 1:1.2. A ratio among a total mass of the barium acetate and the tetrabutyl titanate, a mass of the fructose, and a mass of the urea was 1:10:5. The molten mixture was microwaved for 0.1 minute with a microwave power of 50 kW to cause the fructose to be dehydrated and carbonized to obtain a dark brown solid. The dark brown solid was calcined at 600° C. for 8 hours in an air to remove carbon to obtain the barium titanate nanopowders.

FIG. 3 is an XRD spectrum of cubic phase barium titanate nanopowders made according to the above example embodiment. As shown in FIG. 3, the obtained barium titanate nanopowders are in a cubic phase with a relatively good crystal form.

In another example embodiment, 1.3067 g (0.005 mol) barium nitrate, 1.4830 g (0.0065 mol) tetraethyl titanate, 22.32 g anhydrous glucose, and 27.90 g urea were mixed in a container and heated to 120° C. The barium nitrate, the tetraethyl titanate, the anhydrous glucose, and the urea in the container were stirred and mixed evenly at 90° C. to obtain a molten mixture. A molar ratio between the barium nitrate and the tetraethyl titanate was 1:1.3. A ratio among a total mass of the barium nitrate and the tetraethyl titanate, a mass of the anhydrous glucose, and a mass of the urea was 1:8:10. The molten mixture was microwaved for 60 minutes with a microwave power of 0.1 kW to cause the anhydrous glucose to be dehydrated and carbonized to obtain a dark brown solid. The dark brown solid was calcined at 700° C. for 8 hours in a nitrogen protection atmosphere to obtain a carbon composite carrier-supported nano-barium titanate material. The carbon composite carrier-supported nano-barium titanate material was heat-treated at 400° C. for 10 hours in an air atmosphere to remove carbon to obtain the barium titanate nanopowders.

Figure 4:
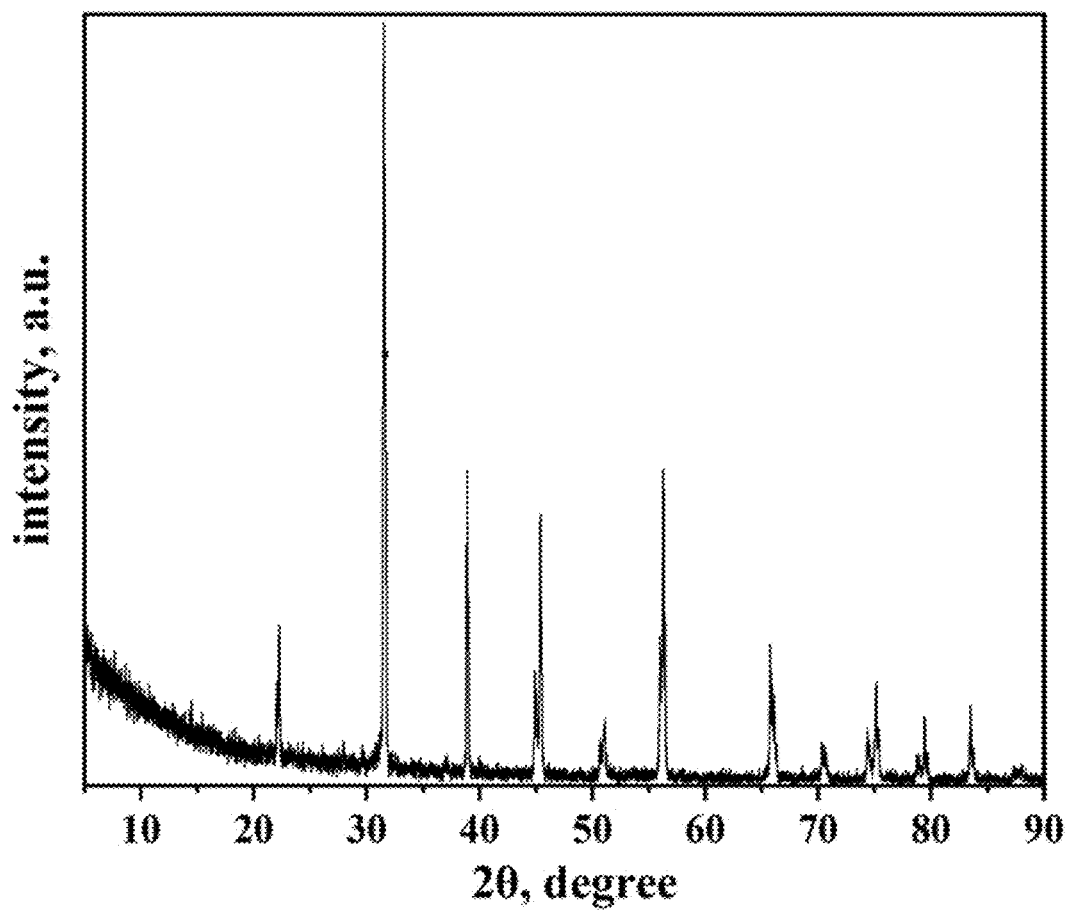
FIG. 4 is an XRD spectrum of tetragonal phase barium titanate nanopowders made according to another example embodiment of the disclosure.

FIG. 4 is an XRD spectrum of tetragonal phase barium titanate nanopowders made according to the above example embodiment. As shown in FIG. 4, the obtained barium titanate nanopowders are in a tetragonal phase with a relatively good crystal form.

Figure 5:
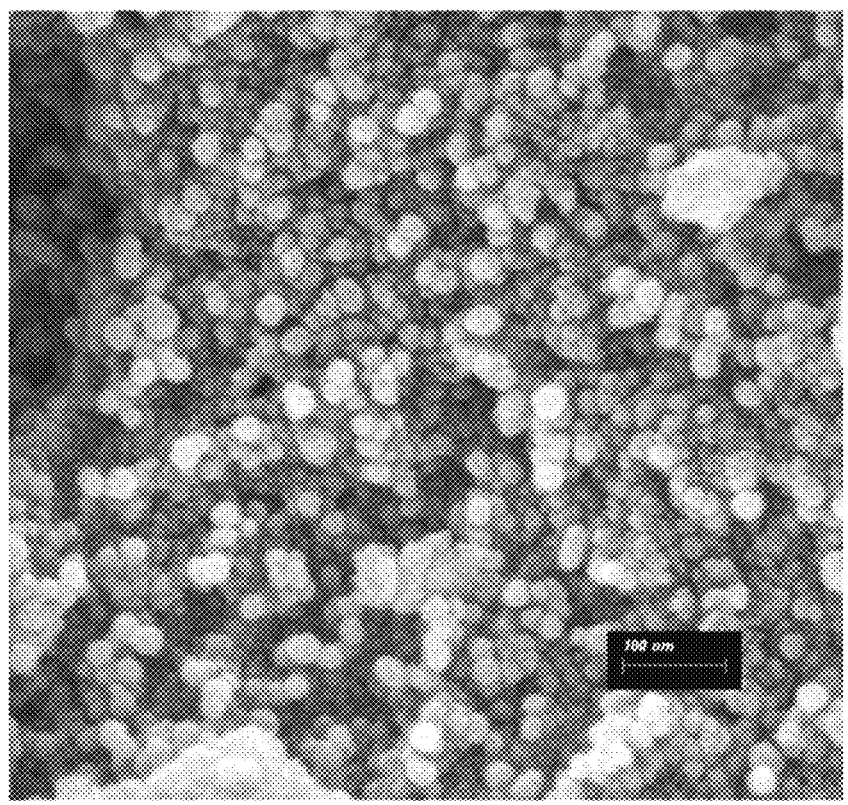
FIG. 5 is a scanning electron microscope (SEM) image of the tetragonal phase barium titanate nanopowders made according to another example embodiment of the disclosure.

FIG. 5 is a scanning electron microscope (SEM) image of the tetragonal phase barium titanate nanopowders made according to the above example embodiment. As shown in FIG. 5, the obtained barium titanate nanopowders have good monodispersity and a uniform size. An average particle size of the obtained barium titanate nanopowders is 48 nanometers.

In another example embodiment, 1.3067 g (0.005 mol) barium nitrate, 2.5524 g (0.0075 mol) tetrabutyl titanate, 3.86 g anhydrous glucose, and 6.00 g urea were mixed in a container and heated to 60° C. The barium nitrate, the tetrabutyl titanate, the anhydrous glucose, and the urea in the container were stirred and mixed evenly at 60° C. to obtain a molten mixture. A molar ratio between the barium nitrate and the tetrabutyl titanate was 1:1.5. A ratio among a total mass of the barium nitrate and the tetrabutyl titanate, a mass of the anhydrous glucose, and a mass of the urea was 1:1:1.55. The molten mixture was put into a 250° C. oven and heated for 8 hours to cause the anhydrous glucose to be dehydrated and carbonized to obtain a dark brown solid. The dark brown solid was calcined at 1000° C. for 4 hours in a argon protection atmosphere to obtain a carbon composite carrier-supported nano-barium titanate material. The carbon composite carrier-supported nano-barium titanate material was heat-treated at 600° C. for 4 hours in an air atmosphere to remove carbon to obtain the barium titanate nanopowders.

Figure 6:
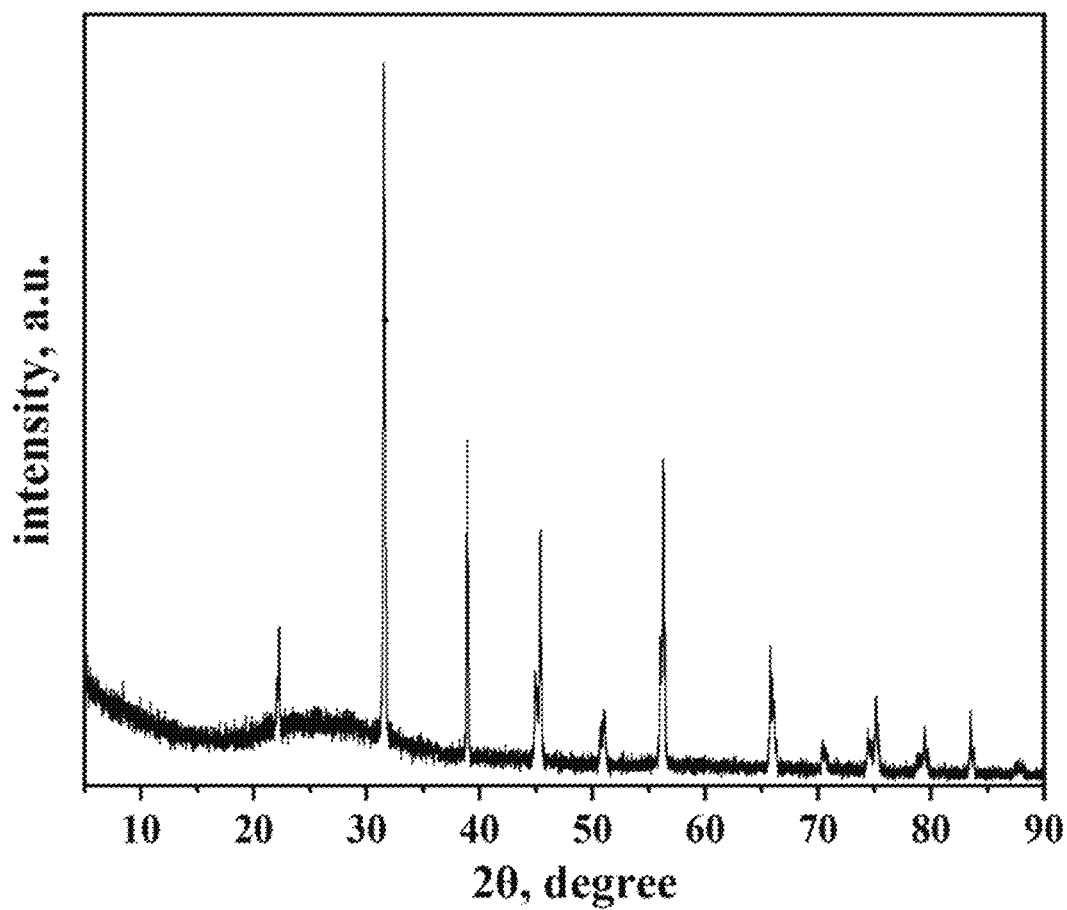
FIG. 6 is an XRD spectrum of a tetragonal phase barium titanate nanopowders made according to another example embodiment of the disclosure.

FIG. 6 is an XRD spectrum of a tetragonal phase barium titanate nanopowders made according to the above example embodiment. As shown in FIG. 6, the obtained barium titanate nanopowders are in a tetragonal phase with a relatively good crystal form.

In another example embodiment, 0.6534 g (0.0025 mol) barium nitrate, 0.6386 g (0.0025 mol) barium acetate, 0.8508 g (0.0025 mol) tetrabutyl titanate, 0.5704 g (0.0025 mol) tetraethyl titanate, 15 g anhydrous glucose, 5 g fructose, and 20 g urea were mixed in a container and heated to 100° C. The barium nitrate, the barium acetate, the tetrabutyl titanate, the tetraethyl titanate, the anhydrous glucose, the fructose, and the urea in the container were stirred and mixed evenly at 80° C. to obtain a molten mixture. A molar ratio between the barium salt and the titanium source was 1:1. A ratio among a total mass of the barium salt and the titanate source, a mass of the anhydrous glucose and the fructose, and a mass of the urea was 1:9.2:7.4. The molten mixture was then put into a 200° C. oven and heated for 24 hours to cause the anhydrous glucose and the fructose to be dehydrated and carbonized to obtain a dark brown solid. The dark brown solid was calcined at 600° C. for 8 hours in an air atmosphere to remove carbon to obtain the barium titanate nanopowders.

In the method for making the barium titanate nanopowders consistent with the embodiments of the present disclosure, an anhydrous eutectic system that is uniformly mixed at the molecular level is formed through complexation of metal ions and the urea in the carbohydrate-urea-salt system and hydrogen bonds between the carbohydrate and the urea. A Maillard reaction of the anhydrous eutectic system occurs under heating conditions. Under the co-regulation of thermodynamics and kinetics, homogeneous nucleation is achieved during metal salt hydrolysis. The metal salt can self-assemble at the molecular level to realizing uniform distribution of size-controlled nanoparticles at a porous carbon templet in one step, thereby forming a "dragon fruit" structure. The carbon templet is removed by calcination at a relatively low temperature to obtain the barium titanate nanopowders. By hydrogen bonding miscible between the carbohydrate and the urea, and complexation between the salt (metal ion) and the urea, the carbohydrate, the urea, and the salt form a eutectic system at a relatively low temperature (lower than the melting point of the salt) under anhydrous conditions to achieve uniform mixing at a molecular level. The dehydration of the carbohydrate triggers salt hydrolysis and sol-gel reactions. Glucose urea is uniformly distributed on the porous carbon templet through Maillard reaction, amide structure, and metal species through the pulling action of nitrogen element to achieve homogeneous nucleation. Therefore, the homogenous nucleation is ensured by the same environment, temperature, and precursor concentration. With same growth history and growth time, the final metal species are self-assembled to obtain the dragon fruit-type composite nanostructure. The size, composition, and distribution of the crystal nucleus are uniform. There is only one stable nucleus in a certain space, thereby avoiding the non-uniform structures such as core-shell and eccentricity formed by nucleation due to the difference in the hydrolysis/condensation speed of the two metals. Like heavy rain and light rain, in a homogenous low eutectic system, the diffusion rate of metal species/oxide/hydrolysate (influenced by temperature and system viscosity) affects the growth rate and size of nuclei. During the self-assembly (e.g., in a given time), there is only one stable nucleus within a certain space (e.g., diffusion distance), and the nearby species diffuse into (e.g., eaten by) the stable nucleus. The concentration of the precursor metal salt determines the size of the oxide particles (i.e., stable crystal nucleus). The carbon templet acts as a support and a barrier. The oxide particles are easily sintered together during the high temperature process. The carbon templet prevents particle growth and aggregation of multiple particles. After the monodisperse metal oxide particles form a specific crystal form at high temperature, the carbon templet is removed. At a relative low temperature (e.g., 400° C.), in a atmosphere of air or oxygen, the carbon templet is oxidized to form carbon dioxide and water. In this way, less or no undesired sintering of oxide particles formed at relative high temperature occurs.

In the method for making the barium titanate nanopowders consistent with the embodiments of the present disclosure, the particle size of the barium titanate nanopowders can be adjusted by adjusting the ratio among the precursors (barium salt and titanium source), the carbohydrate, and the urea. In some embodiments, the molar ratio between the barium salt and titanium source is controlled around (0.99-1.01):1. A proper urea/metal salt ratio ensures a homogenous precursor. The pulling effect of the carbon templet ensures the dragon fruit structure, and controls the diffusion speed of the metal oxide species and the size of the nucleus. Too much carbohydrate and urea may reduce the particle size but increase the cost. The made barium titanate nanopowders have high crystallinity, few impurities, good mono-dispersity, small particle size, and uniform morphology, which is an ideal raw material for manufacturing chip multilayer ceramic capacitors (MLLCCs).

The method for making the barium titanate nanopowders consistent with the embodiments of the present disclosure can reduce the reaction temperature, improve the uniformity of the reaction, and improve the controllability of the powder morphology. The barium titanate nanopowders made by traditional solid-phase method includes grinding barium oxide and titanium oxide at relative high temperature (e.g., 1300° C.) to achieve uniform melting and mixing of the two oxides. In the present disclosure, the barium oxide can be uniformly melted and mixed with the salt and titanium salt at a relative low temperature (e.g., 60° C.-120° C.). Moreover, the method can also reduce the aggregation of particles, simplify the synthesis process, and reduce the cost, which has great application prospects in many aspects such as water treatment and electrochemistry.

Other embodiments of the disclosure will be apparent to those skilled in the art from consideration of the specification and practice of the embodiments disclosed herein. It is intended that the specification and examples be considered as example only and not to limit the scope of the disclosure, with a true scope and spirit of the invention being indicated by the following claims.

What is claimed is:

1. A method for making barium titanate nanopowders, comprising:

mixing barium salt, titanium source, carbohydrate, and urea in a container according to a first ratio, stirring the barium salt, the titanium source, the carbohydrate, and the urea in the container under a heating condition of approximately from 60° C. to 120° C. to obtain a molten mixture, wherein the titanium source includes titanium tetrachloride, titanium tetrabromide, tetraethyl titanate, tetrabutyl titanate, or titanium isopropoxide;

heating the molten mixture to dehydrate and carbonize the carbohydrate to obtain a dark brown solid; and performing a heat treatment on the dark brown solid to obtain the barium titanate nanopowders.

2. The method of claim 1, wherein the first ratio includes a molar ratio between the barium salt and the titanium source as 1:(1-1.5).

3. The method of claim 1, wherein the first ratio includes a ratio among a total mass of the barium salt and the titanium source, a mass of the carbohydrate, and a mass of the urea as 1:(1-10):(1-10).

4. The method of claim 1, wherein the barium salt includes at least one of nitrate, halogenated salt, hypochlorite, acetates, or oxalate.

5. The method of claim 1, wherein the carbohydrate includes at least one of glucose, fructose, sucrose, maltose, lactose, starch, or dextrin.

6. A method for making barium titanate nanopowders, comprising:

mixing barium salt, titanium source, carbohydrate, and urea in a container according to a first ratio, stirring the barium salt, the titanium source, the carbohydrate, and the urea in the container under a heating condition of approximately from 60° C. to 120° C. to obtain a molten mixture;

heating the molten mixture to dehydrate and carbonize the carbohydrate to obtain a dark brown solid; and performing a heat treatment on the dark brown solid to obtain the barium titanate nanopowders, wherein heating the molten mixture to dehydrate and carbonize the carbohydrate to obtain the dark brown solid includes:

heating the molten mixture to dehydrate and carbonize the carbohydrate to obtain the dark brown solid in a normal pressure or in an airtight reaction kettle; and performing at least one of:

microwaving the molten mixture 0.1 minute to 60 minutes with a microwave power of 0.1 kW to 50 kW; or heating the molten mixture at a temperature of 120° C. to 250° C. for 1 hour to 48 hours.

7. A method for making barium titanate nanopowders, comprising:

mixing barium salt, titanium source, carbohydrate, and urea in a container according to a first ratio, stirring the barium salt, the titanium source, the carbohydrate, and the urea in the container under a heating condition of approximately from 60° C. to 120° C. to obtain a molten mixture;

heating the molten mixture to dehydrate and carbonize the carbohydrate to obtain a dark brown solid; and performing a heat treatment on the dark brown solid to obtain the barium titanate nanopowders, wherein performing the heat treatment on the dark brown solid to obtain the barium titanate nanopowders includes calcining the dark brown solid at 400° C. to 600° C. for 1 hour to 10 hours in an air atmosphere to remove carbon to obtain the barium titanate nanopowders.

8. The method of claim 1, wherein performing the heat treatment on the dark brown solid to obtain the barium titanate nanopowders includes:

performing the heat treatment on the dark brown solid at 700° C. to 1000° C. for 1 hour to 8 hours in a protective gas atmosphere to obtain a carbon composite carrier-supported nano-barium titanate material; and performing the heat treatment on the carbon composite carrier-supported nano-barium titanate material at 400° C. to 600° C. for 1 hour to 10 hours in an air atmosphere to remove carbon to obtain the barium titanate nanopowders.

9. The method of claim 1, wherein heating the molten mixture to dehydrate and carbonize the carbohydrate to obtain the dark brown solid includes:

heating the molten mixture to dehydrate and carbonize the carbohydrate to provide a carbon templet to cause the barium salt and the titanium source to be evenly distributed on the carbon templet.

10. The method of claim 9, wherein performing the heat treatment on the dark brown solid to obtain the barium titanate nanopowders includes:

performing the heat treatment on the dark brown solid to remove the carbon templet.

* * * * *